June 23, 1964 S. T. EKHOLM ET AL 3,137,972
ROOFING
Filed March 3, 1961

INVENTOR
Steven T. Ekholm
Theodore G. Burns
BY Robert M. Dunning
ATTORNEY

United States Patent Office 3,137,972
Patented June 23, 1964

3,137,972
ROOFING
Steven T. Ekholm, 534 Cretin Ave. S., and Theodore G. Burns, 622 Watson, both of St. Paul, Minn.
Filed Mar. 3, 1961, Ser. No. 93,083
2 Claims. (Cl. 50—243)

This invention relates to an improvement in roofing, and deals particularly with the use of a laminated roofing in which the outer surface comprises embossed metal foil.

The value of aluminum foil as an insulator and heat reflector has long been recognized. However, the use of metal foil alone as a roofing material is usually impractical, even if relatively thick foil is used, due to the fact that it will tear readily and would not be durable. Accordingly, it has been proposed to laminate aluminum foil to a roofing material such as roofing felt which may be applied to the roof in strips with the edges in overlapped relation. While this has been used with some degree of success, it has the disadvantage that the marginal edge of the roofing felt is exposed where the strips overlap. As a result, the exposed edge is readily torn, and the roofing can be only used on surfaces which have a very pronounced slope due to the fact that moisture will work between the overlapping plys, and the resulting roof will not be watertight.

An object of the present invention lies in the provision of roofing material which comprises an elongated strip of roofing felt or similar material to which is laminated a covering layer of aluminum foil. The aluminum foil strip is somewhat wider than the strip of felt so that an edge of the aluminum foil projects beyond one marginal edge of the felt strip. The free flange of foil is then folded to enclose an edge of the felt, this enclosed edge then forming the outer or exposed edge of the laminated sheet.

A feature of the invention resides in the formation of a roof from strips of laminated roofing material of the type described, with the enclosed edge of the felt lamination overlying the opposite edge of the next adjacent sheet, and in which this enclosed edge is adhered to the next sheet through the use of an epoxy resin adhesive. This adhesive acts to effectively bond the edges of the two sheets, and the sheets or strips are continuously bonded as effectively as if they were welded together. Furthermore, as the adhesive described has a tendency to remain plastic to the extent necessary to permit slight flexing, the roofing may be used on a substantially flat roof with substantially no chance of leakage over an extremely long period of time.

A further feature of the present invention resides in the formation of a composite roofing strip by embossing flat aluminum foil between embossing rolls before it is applied to the base sheet. As a result, the outer surface of the roofing has an embossed or grained effect which is relatively permanent due to the fact that the bonding adhesive tends to fill up the space between the base sheet and the foil.

These and other objects and novel features of the present invention wil be more clearly and fully set forth in the following specification and claims.

In the drawings forming a part of the specification:

The roofing strips are relatively simple in form, and include a base strip 10 of material known to the trade as roofing felt and comprises a fibrous web of material which is impregnated with tile or asphalt to produce a waterproof body. This material is sufficiently brittle to crack if bent at a sharp angle, particularly in cool weather, and as a result, the free edge of the overlapping strip is somewhat vulnerable to injury.

The base strip 10 is laminated through the use of a suitable adhesive to an aluminum foil sheet 11 which is somewhat wider than the strip 10 and which has one free edge extending beyond the corresponding edge of the base sheet. In practice, this free edge which is indicated at 12 is folded over the side edge 13 of the base sheet 10, and along the marginal edge surface of the base sheet. Thus the edge 13 of the base sheet is entirely enclosed with the foil covering.

Figure 1:
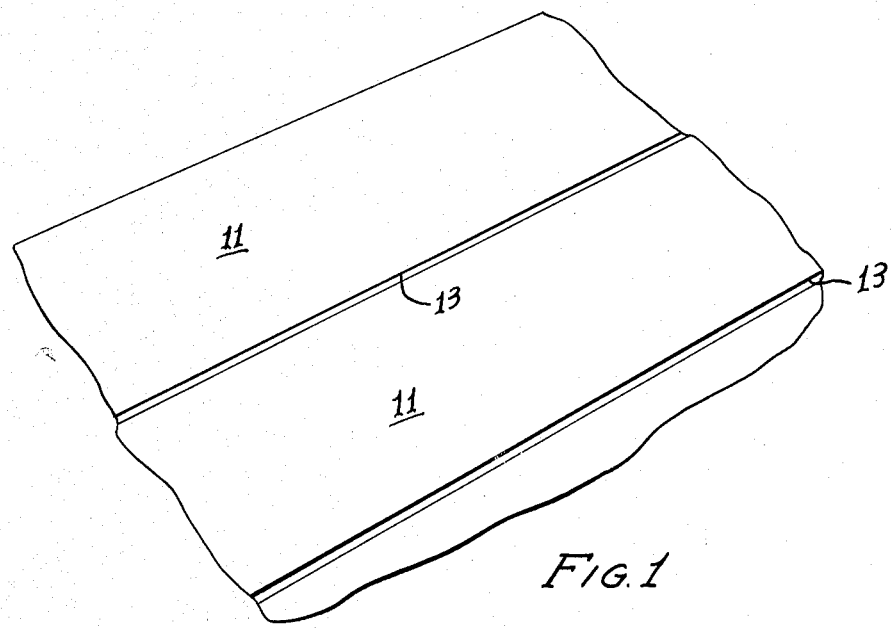
FIGURE 1 is a perspective view of a section of a roof formed of overlapped strips of the roofing material.
Figure 2:
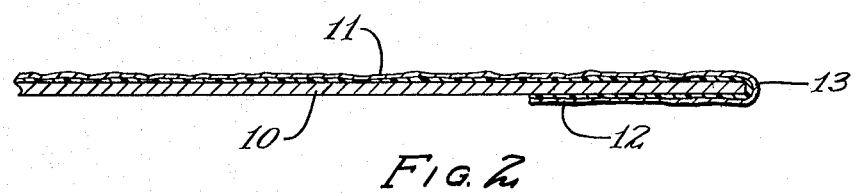
FIGURE 2 is an enlarged sectional view through an edge of the sheet showing the manner in which the foil layer is folded about a longitudinal edge thereof.
Figure 3:
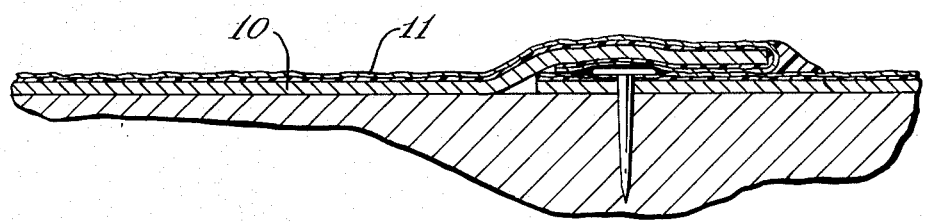
FIGURE 3 is an enlarged sectional detail through the overlapping edges of the adjoining strips showing the manner in which they are bonded together to prevent leakage at the seams.
Figure 4:
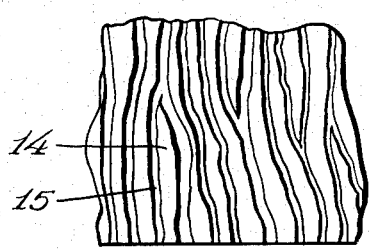
FIGURE 4 is a plan view of a small section of the sheet showing the manner in which it is embossed.

Prior to lamination to the base sheet, the foil is embossed between embossing rolls so that the surface has a grained effect. Embossing the foil sheet greatly stiffens it, and this is particularly true when it is understood that the laminating adhesive tends to fill the voids between the foil lamination and the base sheet to act as a support therefor. The foil layer is also made materially more resistant to tearing due to the fact that the resultant sheet is rendered stretchable or yieldable. The surface of the sheet is provided with transverse irregular ridges and valleys indicated by the numerals 14 and 15 in FIGURE 4 of the drawings.

Due to the fact that the ridges and valleys in the foil sheet extend transversely of the base sheets, the laminated sheet may be rolled, and may be supplied in rolled form.

In applying the roofing to the surface of the roof, the marginal edges of the first sheet may be secured in any suitable means such as by adhesive between the base sheet and the surface of the roof, or by nails. If roofing nails are employed, the heads of any exposed nails are preferably covered with the epoxy resin adhesive which seals the nail heads to the foil lamination and prevents leakage at these points.

The enclosed edge of the next strip is placed in overlapping relation to the first strip, and is preferably adhered to the surface of the roof and to the overlapped edge of the first applied sheet through the use of roofing tar or similar means. When the strips have been overlapped, the seam between the folded edge of the overlying sheet and the surface of the lower sheet is sealed with epoxy resin which is preferably the same general color as the foil. When the seam has been cemented together, a liquid-tight joint is provided between the edges of the sheets which is impervious to moisture. As a result, the roofing may be used on a substantially flat surface, as the roofing and the seams connecting the roofing may be submerged beneath the surface of water without leakage.

In accordance with the patent statutes, we have described the principles of construction and operation of our improvement in roofing, and while we have endeavored to set forth the best embodiment thereof, we desire to have it understood that changes may be made within the scope of the following claims without departing from the spirit of our invention.

We claim:

1. A roof including a plurality of similar strips of roofing having adjoining marginal portions overlapped, each strip including a thin flexible base web and an aluminum foil sheet adhered to the upper surface of the base web, said foil sheet extending continuously from one marginal edge to the other marginal edge of said base web, one terminal edge of said foil sheet being substantially contiguous with said one marginal edge of said web, the marginal edge portion of said sheet opposite to said terminal edge being a return fold enclosing the other marginal edge of said web and extending inwardly along the underside of said base web, said marginal edge portion of each strip overlying a portion of the sheet defining said one terminal edge of an adjoining strip, and a sealing strip of epoxy resin adhesive sealing the overlying sheet portions one to the other.

2. The structure of claim 1 and in which the strips are adhered to the roof.

References Cited in the file of this patent

UNITED STATES PATENTS

| | | |
|---|---|---|
| 2,016,429 | Hayden | Oct. 8, 1935 |
| 2,106,624 | Ray | Jan. 25, 1938 |
| 2,160,845 | Eason | June 6, 1939 |
| 2,512,996 | Bixler | June 27, 1950 |

OTHER REFERENCES

Paint, Oil and Chemical Review, p. 15, Nov. 9, 1950.